United States Patent
Tan et al.

(10) Patent No.: US 8,720,848 B2
(45) Date of Patent: May 13, 2014

(54) APPARATUS FOR SECURING A PORTABLE ELECTRONIC DEVICE

(75) Inventors: John Tan, Vancouver (CA); Ryan P. White, Salem, MA (US); Robert Mahaffey, Vancouver (CA)

(73) Assignee: ACCO Brands Corporation, Lake Zurich, IL (US)

( * ) Notice: Subject to any disclaimer, the term of this patent is extended or adjusted under 35 U.S.C. 154(b) by 460 days.

(21) Appl. No.: 13/014,651

(22) Filed: Jan. 26, 2011

(65) Prior Publication Data

US 2011/0185774 A1    Aug. 4, 2011

Related U.S. Application Data

(60) Provisional application No. 61/299,807, filed on Jan. 29, 2010.

(51) Int. Cl.
*F16M 13/00*    (2006.01)

(52) U.S. Cl.
USPC ...... 248/551; 248/346.01; 248/680; 248/918; 361/679.55

(58) Field of Classification Search
USPC .......... 248/346.01, 551, 552, 553, 676, 680, 248/681, 918, 291.1; 361/679.55, 679.57
See application file for complete search history.

(56) References Cited

U.S. PATENT DOCUMENTS

| | | | |
|---|---|---|---|
| 5,836,183 A | 11/1998 | Derman | |
| 6,216,499 B1 * | 4/2001 | Ronberg et al. | 70/58 |
| 6,308,928 B1 * | 10/2001 | Galant | 248/553 |
| 6,443,417 B2 * | 9/2002 | Galant | 248/553 |
| 7,174,752 B2 * | 2/2007 | Galant | 70/58 |
| 7,611,112 B2 * | 11/2009 | Lin | 248/274.1 |
| 7,866,623 B2 * | 1/2011 | Lampman et al. | 248/551 |
| 8,061,164 B2 * | 11/2011 | Johnston et al. | 70/58 |
| 2005/0248914 A1 | 11/2005 | Allen | |
| 2008/0158806 A1 | 7/2008 | Kuo | |
| 2008/0186665 A1 | 8/2008 | Kuo | |

OTHER PUBLICATIONS

Search Report and Written Opinion in PCT/US2011/022766, mailed Sep. 27, 2011, 10 pages.

* cited by examiner

*Primary Examiner* — Steven Marsh
(74) *Attorney, Agent, or Firm* — Michael Best & Friedrich LLP

(57) ABSTRACT

A securing device for securing portable electronic devices and the method of using the securing device are disclosed. The securing device has a plate assembly, a post assembly and a main bar. A portable electronic device is inserted in-between the plate assembly and the main bar. Thereafter, the post assembly is rotated from a first position to a second position which is perpendicular to the length of the plate assembly. While in the second position, the post assembly prevents the rearward movement of the portable electronic device. The main bar prevents the upward movement of the portable electronic device. The plate assembly has a recessed profile that allows airflow through the bottom portion of the portable electronic device while being secured with the securing device.

17 Claims, 16 Drawing Sheets

APPARATUS FOR SECURING A PORTABLE ELECTRONIC DEVICE

CROSS-REFERENCES TO RELATED APPLICATIONS

This is a non-provisional patent application, which claims priority to U.S. provisional patent application No. 61/299,807 filed on Jan. 29, 2010, which is herein incorporated by reference in its entirety for all purposes.

BACKGROUND

Several devices have been developed to inhibit the theft of portable electronic devices such as laptop and computers. Some of such devices are in the form of a lock and a cable securing a portable electronic device at one end of the cable. The cable is attached to an immovable object at the other end. Some other devices are in the form of mechanisms that secure a portable electronic device to a surface using a retaining rod, or a clamp shaped fixture. Although such devices secure a portable electronic device from theft, they may provide operational problems for the laptop itself. Such devices have rigid designs that may block one or more ports of the portable electronic devices, and prevent a user from using the portable electronic device while secured with the device. Moreover, some devices may block the cooling fan of the portable electronic devices thereby causing overheating, or in some cases, permanent damage to the portable electronic device.

Embodiments of the invention address these and other problems, individually and collectively.

BRIEF SUMMARY

Embodiments of the present invention relate to securing devices for inhibiting the theft of portable electronic devices, as well as methods for using such securing devices.

One embodiment of the invention can be directed to a securing device used for securing a portable electronic device having a plate assembly, a main bar connected to the plate assembly and a post assembly also connected to the plate assembly, which can support a portable electronic device. The main bar can be coupled to the plate assembly and a portable electronic device is capable of being secured between the main bar and the plate assembly and the post assembly. The post assembly can have a first position and a second position, and the portable electronic device can be inserted between the plate assembly and the main bar when the post assembly is in the first position, while it can be secured and prevented from rearward movement while the post assembly is the second position.

Another embodiment of the invention can be directed to a post assembly having a first slider portion, a second slider portion housing the first slider portion, a trap plate coupled to a bottom portion of the first slider portion, and a top portion coupled with the second slider portion. The first slider portion can be secured to the second slider portion using a plurality of pins. One end of the second slider portion can have a plurality of protrusions, and the trap plate can have a bottom surface, which can be adapted to be captured, from its sides, by the plurality of protrusions. The second slider portion can also move along the length of the first slider portion. Each of the first slider portion and the second slider portion can have a plurality of holes. A cable or other device is able to pass through the first slider portion and the second slider portion when at least some of the holes in the plurality of holes are aligned.

Another embodiment of the invention can be directed to the post assembly that is configured to be moved to the second position from the first position by rotating the post assembly to an upright position.

Another embodiment of the invention is directed to a method of securing a portable electronic device, using the securing device, by inserting the bottom portion of the portable electronic device in-between the main bar and the plate assembly while in an open configuration, and moving the post assembly from the first position to the second position. In an open configuration, a screen portion of the portable electronic device that is hingedly connected to the bottom portion is substantially perpendicular to the bottom portion. When the portable electronic device is inserted in-between the plate assembly and the main bar, the an area of the bottom portion of the portable electronic device rests on the plate assembly. Also, a cable or a pad lock may be inserted through a plurality of holes of the post assembly to prevent the post assembly from moving back to the first position.

Another embodiment of the invention can be directed to the post assembly being adapted to slide along a portion of the length of the plate assembly, thereby allowing access to the rear portion of the portable electronic device when inserted in between the plate assembly and the main bar.

Another embodiment of the invention can be directed to the plate assembly having a recessed profile allowing airflow through a bottom portion of the portable electronic device.

Another embodiment of the invention can be directed to the main bar being partially covered by a protective sleeve preventing scratches to a screen of the portable electronic device secured with the securing device.

Further details regarding embodiments of the invention are provided below in the Detailed Description, drawings and claims.

DETAILED DESCRIPTION

Embodiments of the invention disclosed herein include a securing device capable of securing a portable electronic device while allowing operational accessibility to the portable electronic device when it is secured with the securing device. Embodiments of the invention also include a securing device that advantageously provides for the ability to access the ports of a portable electronic device when it is secured with the securing device.

Figure 1:
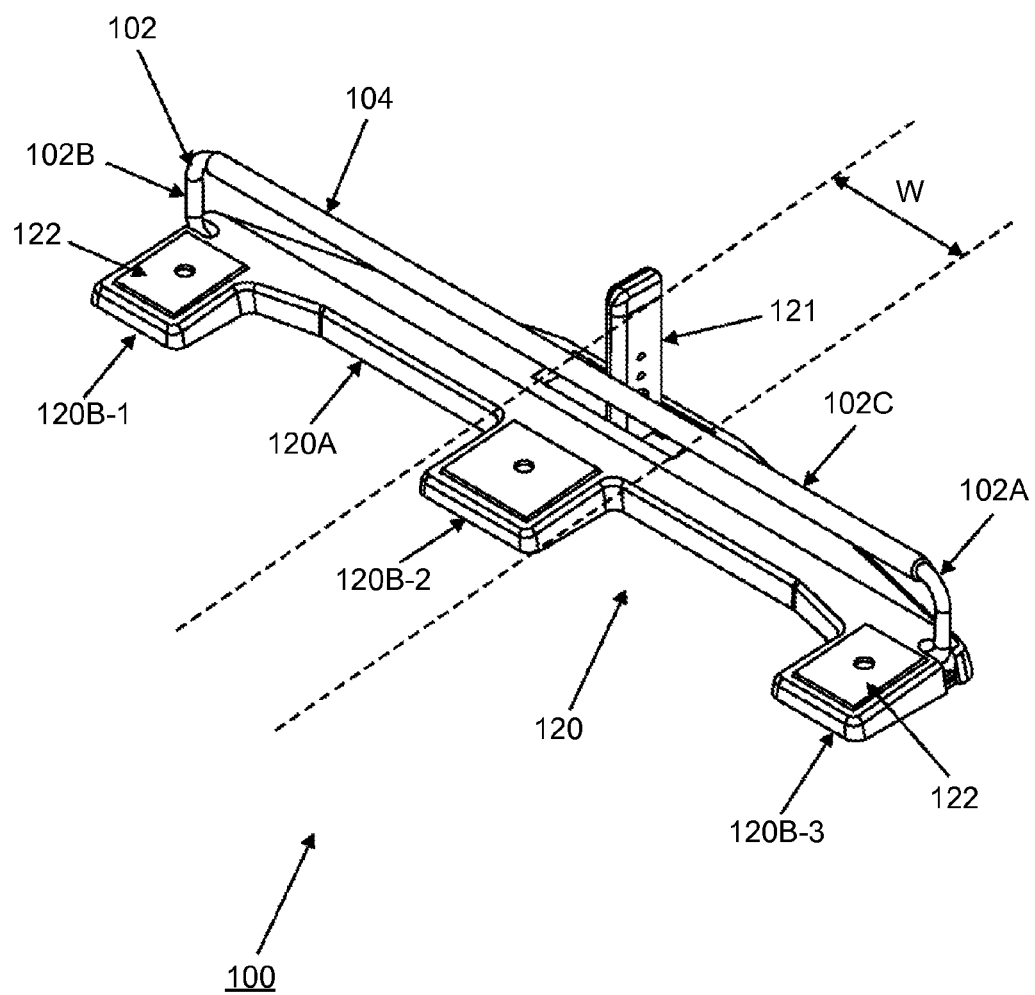
FIG. 1 shows a perspective view of a securing device according to an embodiment of the invention.

FIG. 1 illustrates the securing device 100 according to an embodiment of the invention. The securing device 100 comprises a plate assembly 120, a post assembly 121, and a main bar 102 which is partially covered by a protective sleeve 104. The securing device 100 can be used on a base such as a desk or table.

The plate assembly 120 can be in any suitable form, and may comprise any suitable materials. For example, the plate assembly 120 embodiment in FIG. 1 comprises a planar, elongated portion 120A, which has a plurality of support members 120B-1, 120B-2, 120B-3 extending perpendicular from the elongated portion 120A. The support members 120B-1, 120B-2, 120B-3 may be separable or integral with the elongated portion 120, and they may be configured to support a portable electronic device such as a laptop computer and/or a netbook computer. They may also have a number of contact pads 122 (e.g., elastomeric pads), which can support the portable electronic device while minimizing potential damage (e.g., scratches) to it.

The spaces between adjacent support members 120B-1, 120B-2, 120B-3 can create space between, for example, a laptop computer and a table upon which the plate assembly 120 sits. This advantageously allows for the laptop computer to dissipate heat.

The main bar 102 can be have ends including a first end section 102A and a second end section 102B and an elongated section 102C between the first and second end sections 102A, 102B. The first and second end sections 102A, 102B may be oriented perpendicular to the elongated section 102C and may be permanently or temporarily coupled to opposite ends of the plate assembly 120. A protective sleeve 104 may cover at least the elongated section 102C of the main bar 102, to minimize potential damage (e.g., scratching), for example, to a display of a laptop computer (not shown). The main bar 102 may be made out of any suitable material including stainless steel.

The post assembly 121 is configured to be in a first position or a second position, and it can pivot about a pivot point to allow a portable electronic device to be secured or separate from the securing device 100. Further details about the post assembly 121 are provided below.

In an embodiment, a portable electronic device (not shown) may be secured by the securing device 100 by being placed in-between the plate assembly 120 and the main bar 102. The main bar 102 prevents the upward movement and the first and second end sections 102A and 102B, limit the side movements of the portable electronic device.

The post assembly 121 is capable of being in a first position and a second position. In the first position, the length of the post assembly 121 can be substantially parallel to the length of the plate assembly 120 and the main bar 102. When the post assembly 121 is the first position, a portable electronic device can be inserted in-between the plate assembly 121 and the main bar 102. Thereafter, the post assembly 121 can be rotated about a pivot point, which may be located at the point where it permanently connects to the plate assembly 120. In the second position, the post assembly 121 is substantially perpendicular (in 90 degree angle) to the plate assembly 120 and the main bar 102. The post assembly 121 then prevents the rearward movement of the portable electronic device.

FIG. 1 illustrates the securing device 100 while the post assembly 121 is in its second position. The post assembly 121 may be moved linearly along the line W thereby providing access to the ports of a portable electronic device while it is secured with the securing device 100. As shown, the length of line W may less than about one half of the length of plate assembly 120.

Figure 2:
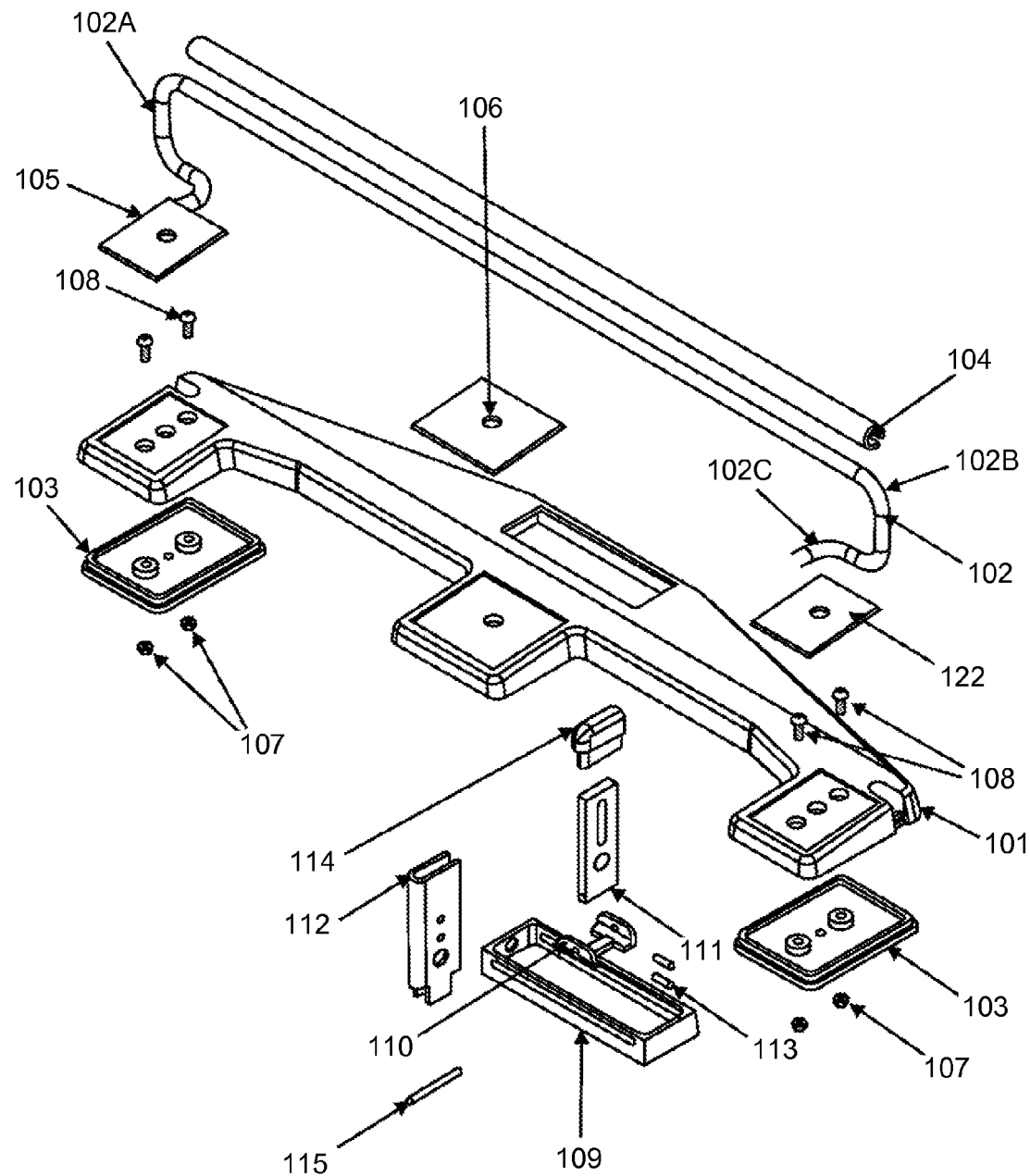
FIG. 2 shows an exploded view of a securing device, according to an embodiment of the invention.

FIG. 2 is the exploded view of all of the parts used to assemble the securing device 100, including the plate assembly 120 and the post assembly 121 illustrated in FIG. 1. The plate assembly 120, as shown in FIG. 2, includes one or more of a main plate 101 (which may comprise plastic), contact pads 122 (which may comprise foam rubber), end-caps 103 (which may comprise plastic), a nut 107 (which may comprise metal), a screw 108, a post insert 109 (which may comprise plastic), and a pin 115 (which may comprise metal).

The plate assembly 120 secures the main bar 102 by trapping its ends in-between the bar end-cap 103 and the main plate 101. As shown, the end sections 102A, 102B of the main bar 102 can have a downward portion and a curved portion, perpendicular to the downward portion. The end-caps 103 are secured to corresponding portions of the plate assembly 120 using the screws 108 and corresponding nuts 107. The contact pads 122 are secured (e.g., with an adhesive) to corresponding top surfaces of the plate assembly 120 to protect the bottom portion of a portable electronic device when it is placed on the plate assembly 120. The post insert 109 can be at the bottom portion of the plate assembly 120 and can house and engage at least a portion of the post assembly 121 (this is described in further detail below).

Figure 3:
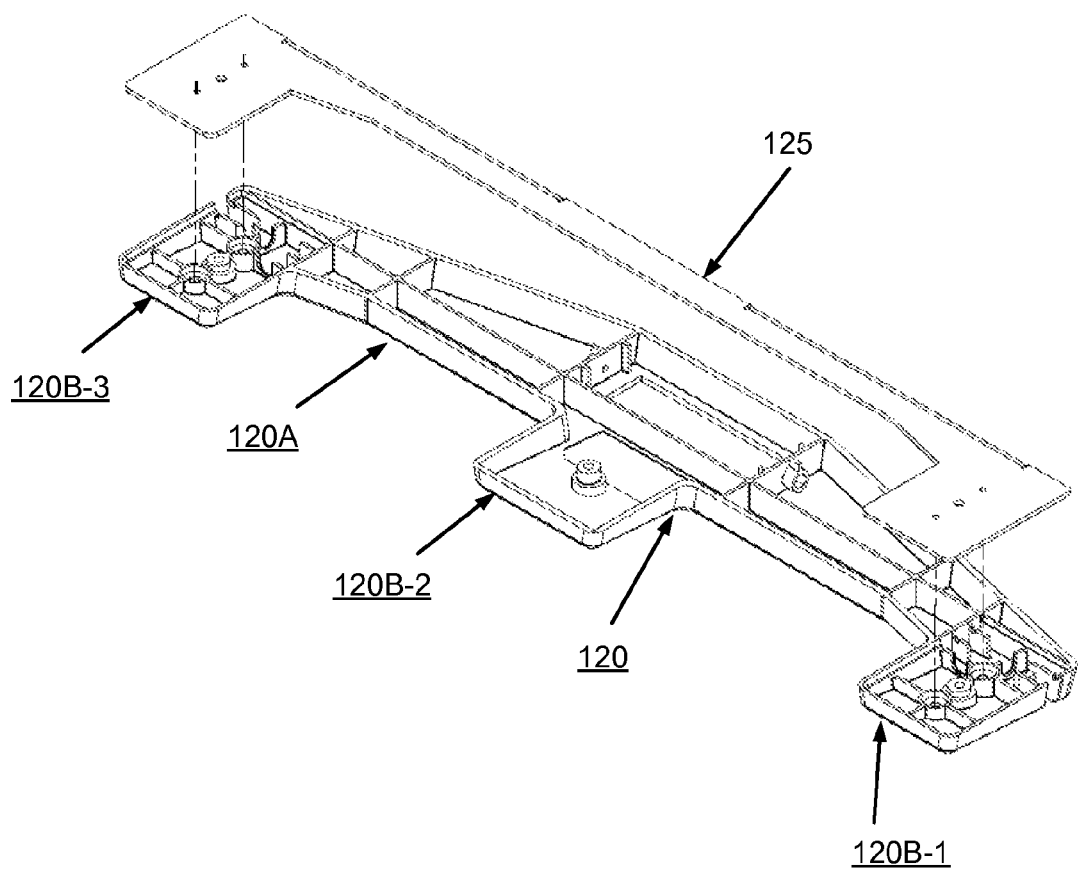
FIG. 3 shows the bottom side of the pate assembly according to an embodiment of the invention.

FIG. 3 shows the bottom side of the plate assembly 120. In one embodiment, a plate 125 shown in FIG. 3 may be attached to the bottom portion of the plate assembly 120. The plate 125 may be a metal plate so that it prevents the flexing of the plate assembly 120 and advantageously increases the structural strength of the securing device.

Figure 4:
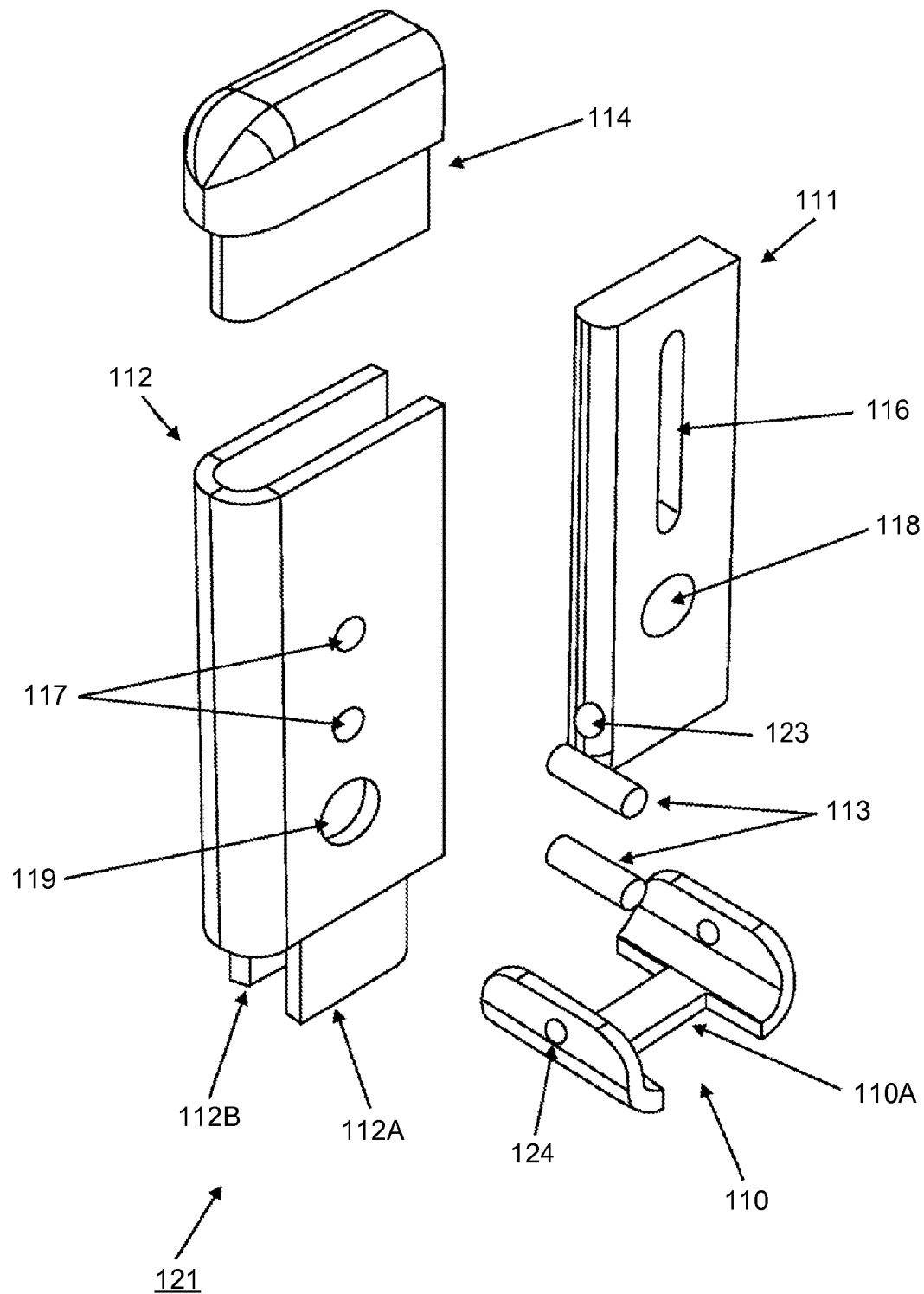
FIG. 4 shows an exploded view of a post assembly used in the securing device, according to an embodiment of the invention.
Figure 5:
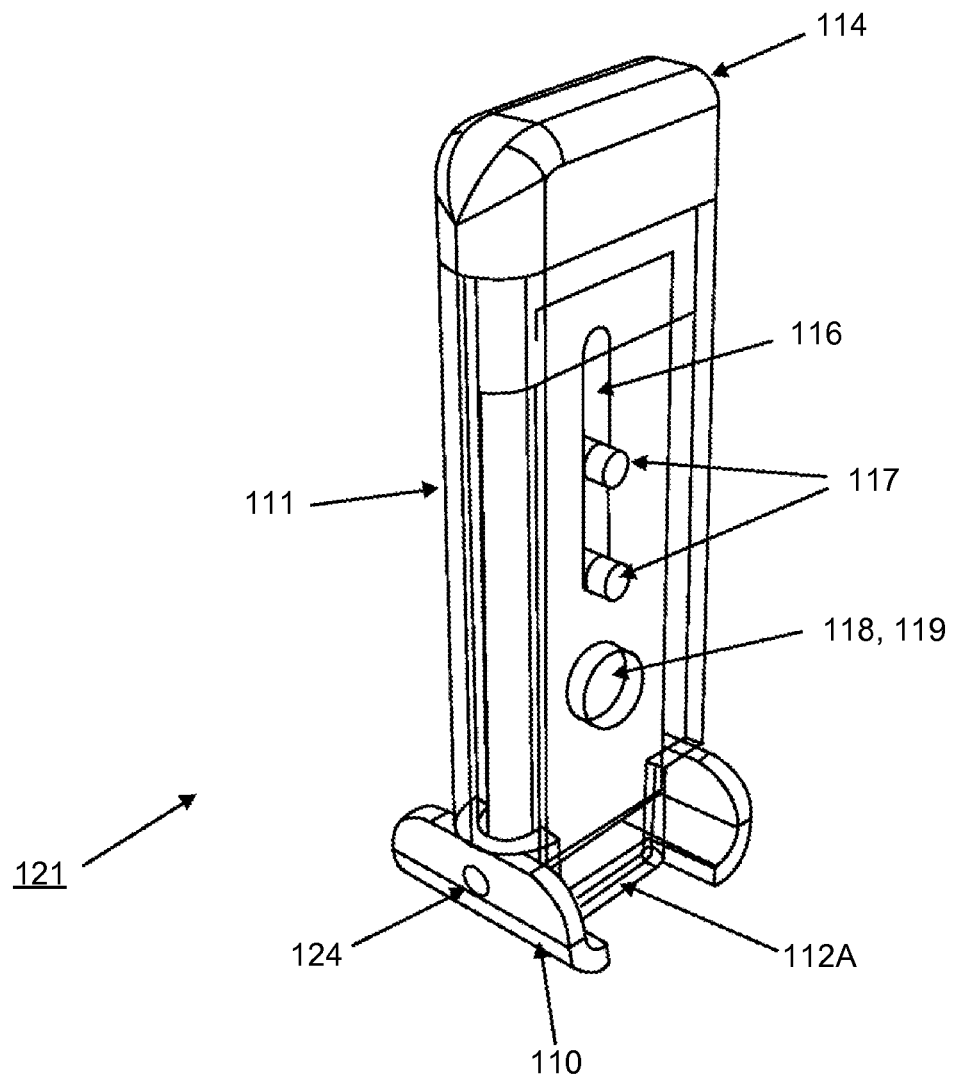
FIG. 5 shows a perspective view of the post assembly, according to an embodiment of the invention.

Referring now to FIG. 4, FIG. 4 shows an exploded view of the post assembly 121. The post assembly 1 21 can include a first slider portion 111, a second slider portion 112, a plastic top 114, pins 113, and a trap plate 110. All of these elements are coupled together as shown in FIG. 5.

In the post assembly 121, the first slider portion 111 is placed inside the second slider portion 112 and is secured to the second slider portion 112 using the pins 113. The first and second slider portions 111, 112 are slideably engaged with each other and can slide linearly with respect to each other.

The pins 113 are perpendicular to the orientations of the first and second slider portions 112 and 113. The trap plate 110 is coupled to the bottom of the first slider portion 111, and is secured to the first slider portion 111 using the pin 115 (from the plate assembly 120 shown in FIG. 2). The plastic top 114 is secured to the top of the second slider 112 to complete the assembly. Although the post assembly 121 in FIG. 4 has a number of different components, embodiments of the invention are not limited thereto. For example, in other embodiments, the plastic top 114 and the second slider portion 117 could be a single, integral unit.

In operation, the first slider portion 111 can be constrained by the second slider portion 112. The second slider portion 112 can then move along the length of the first slider portion 111. The movement of the second slider portion 112 can be controlled at least in part by the length of an elongated opening 116 formed in a side of the first slider portion 111. When the first slider portion 111 is constrained by the second slider portion 112, two pins 113 are respectively located in two holes 117 (e.g., circular holes) formed in a side of the second slider portion 112 and in the elongated opening 116 on the side of the first slider portion 111. This is shown more clearly in FIG. 5, which shows the post assembly 121 in its assembled state. The length of the elongated opening 116 limits the movement of the pins 113, thereby controlling the movement of the second slider portion 112 along the length of the first slider portion 111.

The movement of the second slider portion 112 along the length of the first slider portion 111, allows for alignment of security holes 118, 119 formed in both of the major side walls of both of the first slider portion 111 and the second slider portion 112, as shown in FIG. 5. As shown in FIG. 4, the second slider portion 112 may include two major sidewalls, connected by a minor sidewall, and these sidewalls may form a U-shape.

When the security holes 118, 119 of the first slider portion 111 and the second slider portion 112 are aligned, a cable (or a padlock) may be inserted through the security holes 118, 119, at which time the movement of the second slider portion 112 will be constrained.

The post assembly 121 can be permanently coupled to the plate assembly 120 via the pin 115 (shown in FIG. 2). The trap plate 110 can be located inside of the post insert 109 (as shown in FIG. 2) and the pin 115 can pass through a lateral, elongated opening in the side of the post insert 109, the attachment hole 124 of the trap plate 110 and the attachment hole 123 formed in a minor sidewall of the first slider portion 111. The post assembly 121 can then be permanently secured to the plate assembly 120. The post assembly 121 can also pivot about the pin 115, because one end of the post assembly 121 is attached thereto. Therefore, pin 115 allows the post assembly 121 to move from a first position (e.g., substantially parallel to the length of the plate assembly 120 and the main bar 102) to a second position (e.g., substantially perpendicular to the plate assembly 120) while being permanently coupled to the plate assembly 120. Thereafter, the post assembly 121 can move from the first position to the second position and can also move along the line W while it does not separate from the plate assembly during normal operation. This feature is particularly advantageous since the permanent connection of the post assembly 121 to the plate assembly 120 prevents it from getting lost or misplaced.

When the post assembly 121 is moved to the second position (e.g., an upright position at a 90° angle with respect to the base of the plate assembly 120), a central portion 110A of the trap plate 110 captures inwardly facing protrusions (not shown) at the bottom legs 112A, 112B of the second slider portion 112. Thereafter, the bottom surface of trap plate 110 is captured, from its sides, by the protrusions of the second slider portion, thereby constraining the rotational movement of the post assembly 121. To move the post assembly 121 from the second position (e.g., vertical) to the first position (e.g., horizontal), a user can simply use force to disengage the protrusions from the central portion 110(a) of the trap plate 110.

While the post assembly 121 is in the second position, it will be able to move along the line W as shown in FIG. 1. The pin 115 allows the trap plate 110 (and the entire post assembly 121) to move about the length of the opening (which is equal to the distance of the line W) of the post insert 109.

Figure 6:
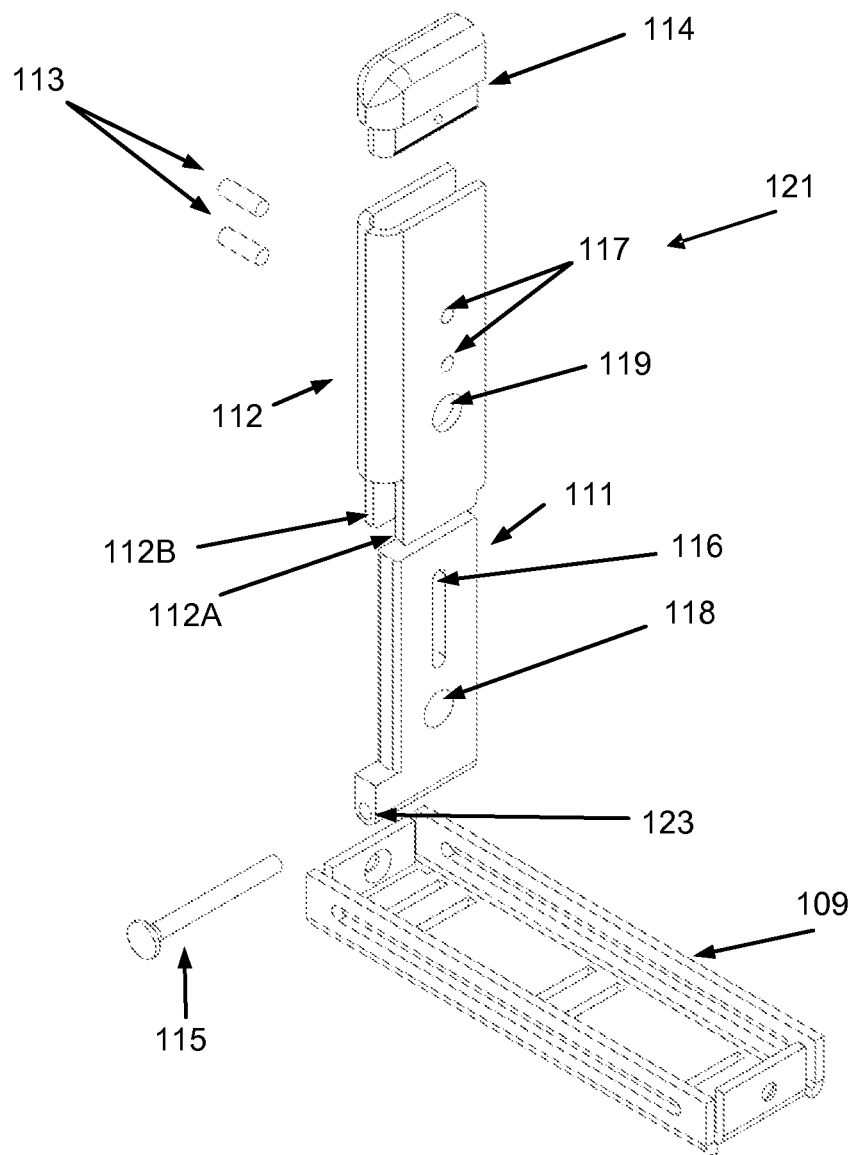
FIG. 6 shows the post assembly and the post insert according to an embodiment of the invention.
Figure 7:
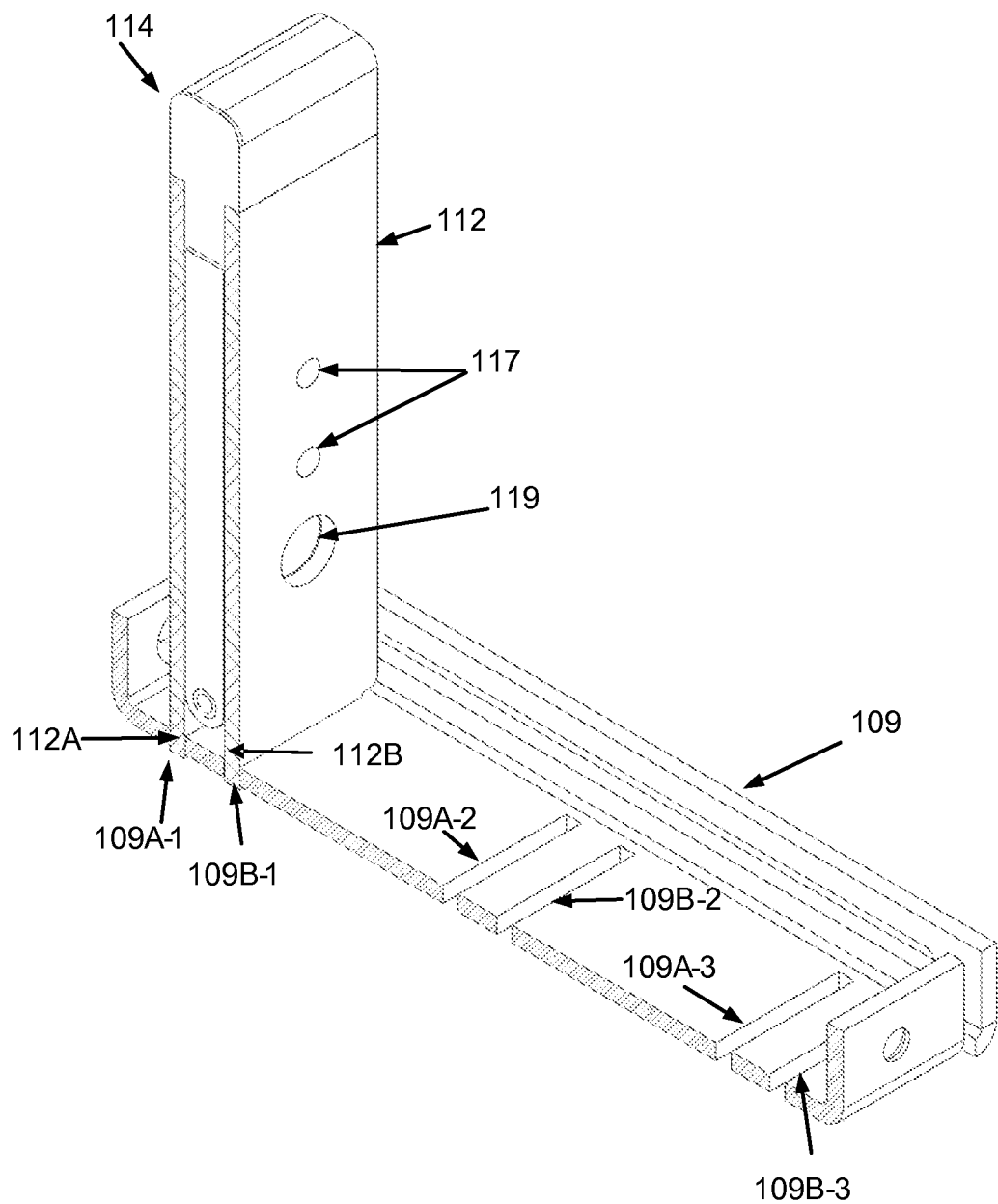
FIG. 7, shows the post assembly secured in a second position by the post insert according to an embodiment of the invention.

Referring now to FIG. 6, in another embodiment, the first slider portion 111 may be directly coupled with the post insert 109 via pin 115. The pin 115 can pass through a lateral, elongated opening in the side of the post insert 109 and the attachment hole 123 formed in a minor sidewall of the first slider portion 111. In this embodiment, instead of using the trap plate 110 (shown in FIG. 4) the post assembly 121 is coupled with the post insert 109 by inserting the pin 115 in the attachment hole 123. As shown in FIG. 7, the bottom surface of the post insert 109 can have three pairs of parallel slots 109A-1, 109B-1, 109A-2, 109B-2, 109A-3, and 109B-3. In this embodiments, the bottom legs 112A and 112B of the second slider portion 112 can be inserted in the slots in the bottom surface of the post insert 109 and secure the post assembly 121 in the second position. Although three pairs of slots are shown in FIG. 7, it will be understood that the post insert 109 may have more or less slots.

Figure 8:
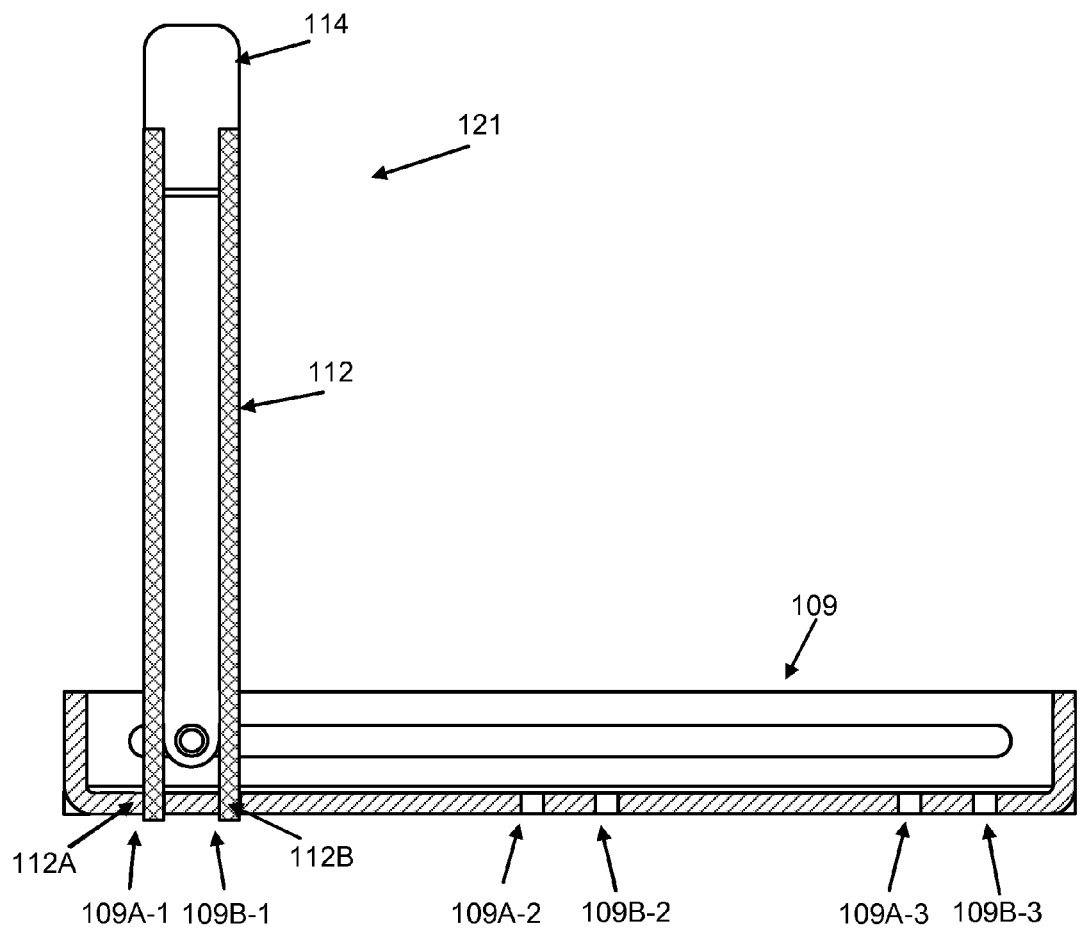
FIG. 8 shows a rear view cross section of the post assembly while secured in the second position according to an embodiment of the invention.

FIG. 8 shows the cross section of the post insert 109 with the post assembly 121 secured in the second position. As shown in FIG. 8, the bottom leg 112A of the post assembly 121 is inserted in the slot 109A-1 and the bottom leg 112B is inserted in the slot 109B-1.

In comparison with the embodiment shown in FIGS. 4 and 5, the post assembly shown in FIGS. 6, 7 and 8 is able to be secured in discrete number of positions along the length of the post insert 109 depending on the position of the slots on the bottom surface of the post insert 109.

Having described the assembly process of the securing device 100, the method of operation of the securing device 100 will now be described with reference to the Figures.

Figure 9A:
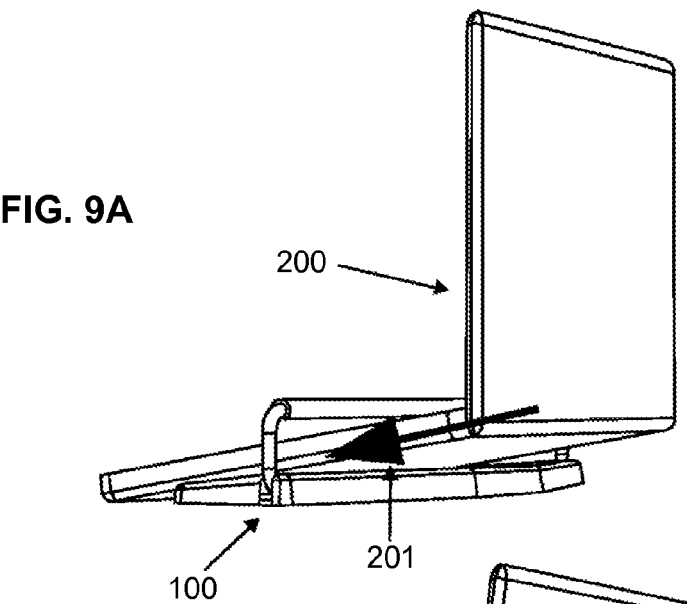
FIGS. 9a, 9b, and 9c, illustrate perspective views of a portable electronic device and a securing device secures the portable electronic device, according to an embodiment of the invention.
Figure 9B:
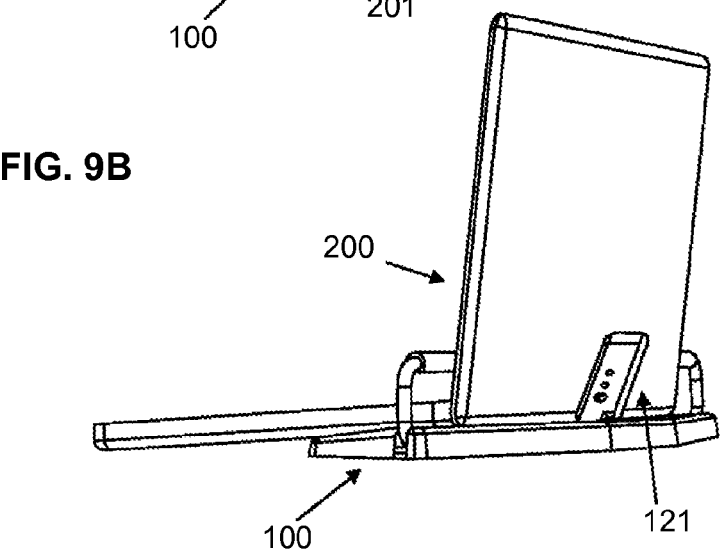
Figure 9C:
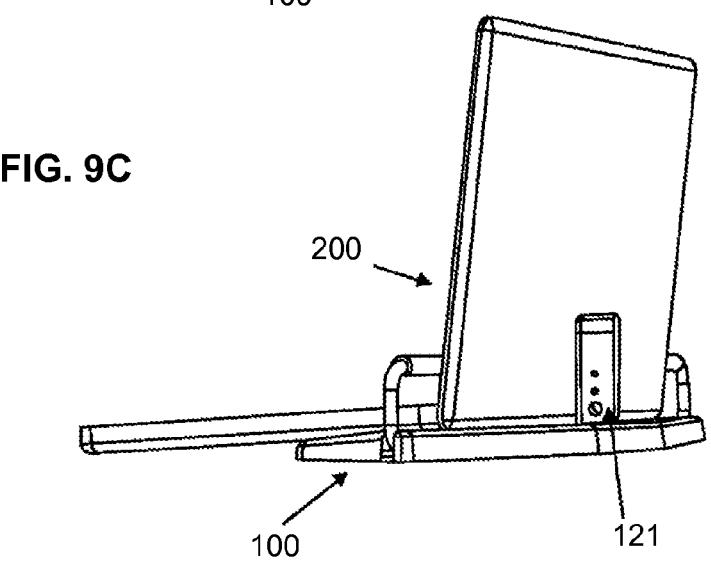

FIG. 9a, FIG. 9b, and FIG. 9c illustrate the steps of using the securing device 100 to secure a portable electronic device according to one embodiment of the invention. In these Figures, a laptop computer 200 comprising a bottom portion 200A and a screen portion 200B is shown as one example of a portable electronic device. The bottom portion 200B comprises a keyboard of a laptop computer. As shown in FIG. 9a, the laptop computer 200 is inserted from the back of the securing device 100 and placed on top of the plate assembly 120, and below the main bar 102. The laptop computer 200 is inserted in direction 201 until it is in between the main bar 102 and the post assembly 121. As shown in FIG. 9b, the post assembly 121 is rotated until it is in the upright position (the second position), as shown in FIG. 9c. The main bar 102 prevents the upward movement of the laptop computer 200, while the post assembly 121 prevents the rearward movement of the laptop computer 200. The main bar 102 is secured to the plate assembly 120 by the main plate 101 and the bar end-cap 103 at each end of the main bar 102 (FIG. 2).

Figure 10A:
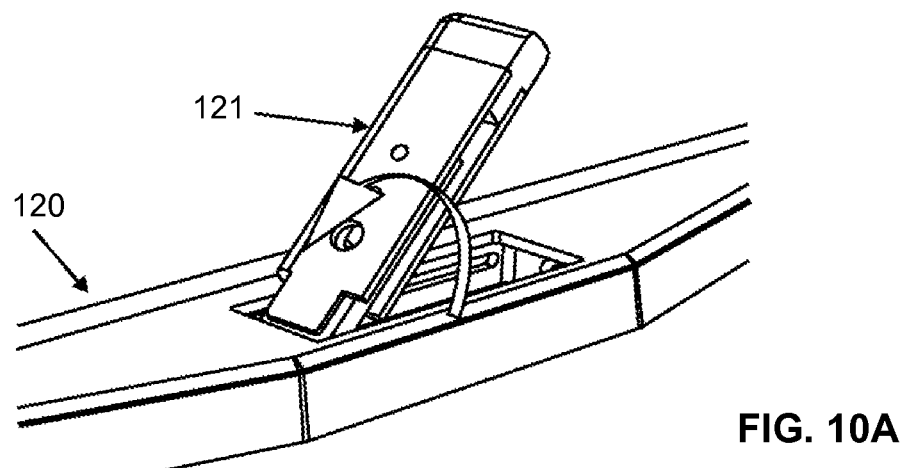
FIGS. 10a, 10b, and 10c, illustrate a perspective view of a post assembly as it is moved from a first position to a second position, and a method of locking the post assembly in the second position using a cable according to an embodiment of the invention.
Figure 10B:
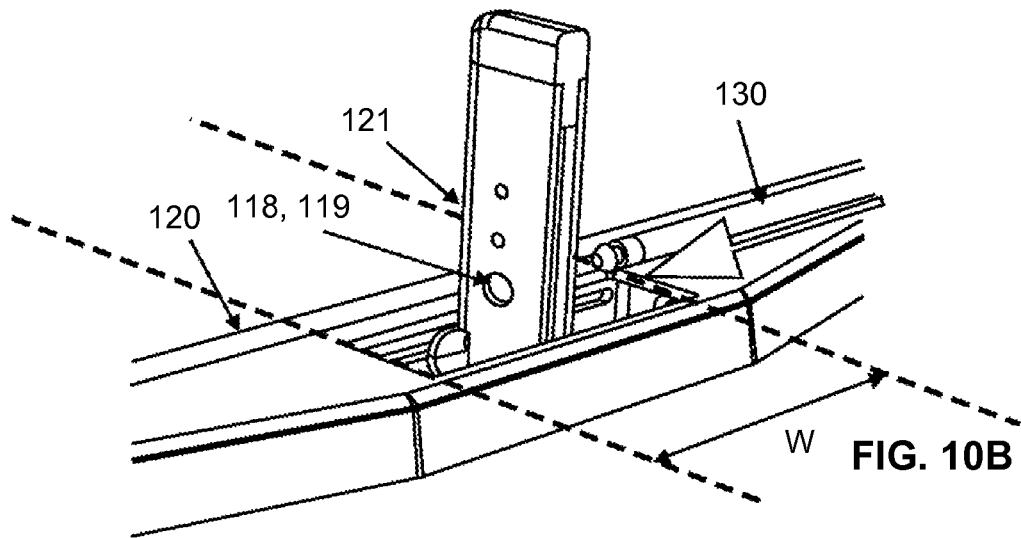
Figure 10C:
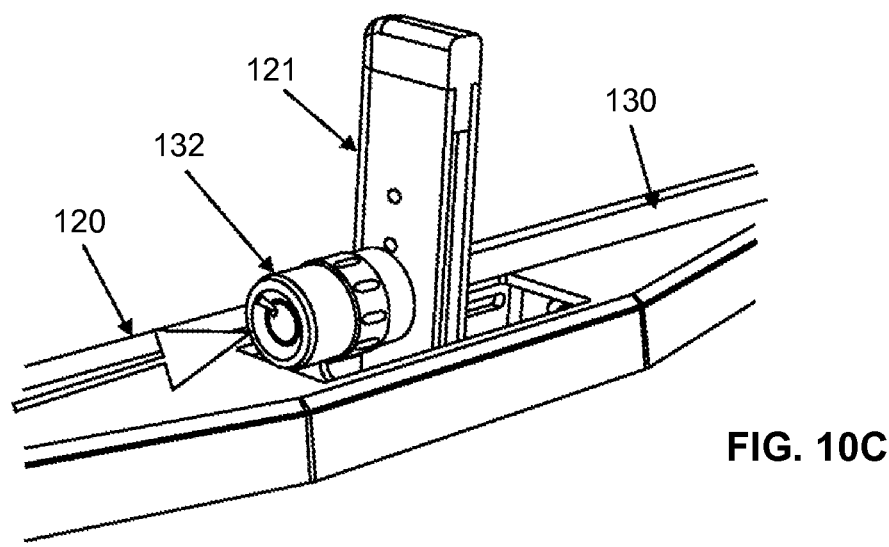
Figure 11:
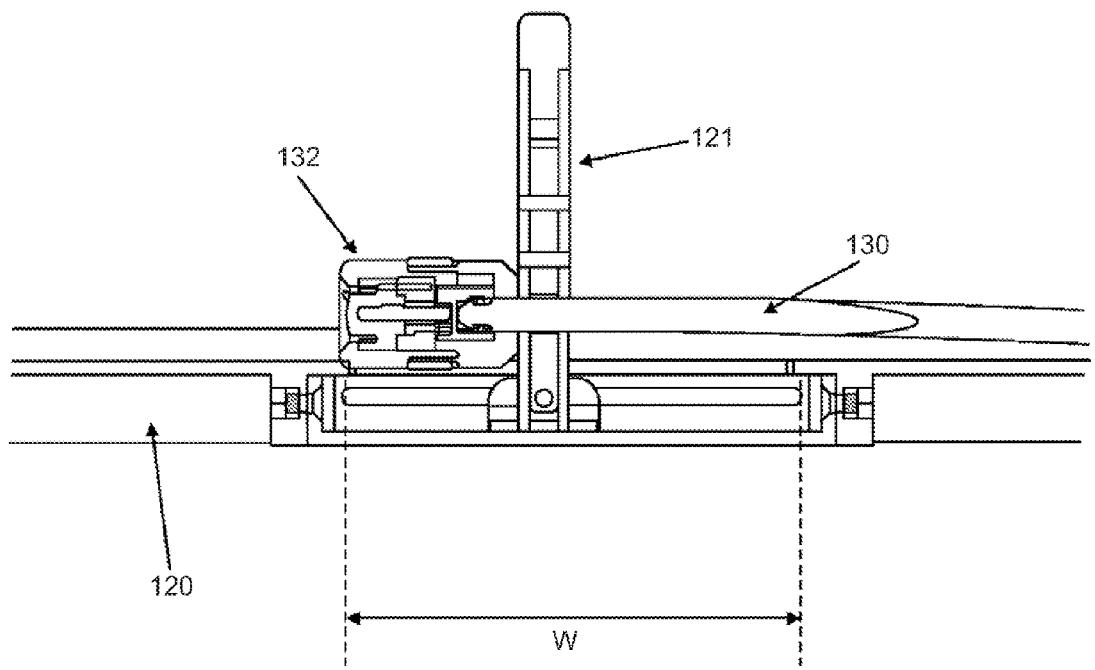
FIG. 11 shows a rear view cross section of a securing device showing lockout of the post assembly using a cable, according to an embodiment of the invention.

FIG. 10a, FIG. 10b, and FIG. 10c illustrate close-up views of the post assembly 121 and a method of securing a laptop computer 200, according to an embodiment of the invention. FIG. 10a shows the post assembly 121 while being rotated toward the second position (upright position). While in the second position, the post assembly 121 can move along the line W, as shown in FIG. 10b. FIG. 10b also shows the cable 130 being inserted through the holes of the first slider portion 111 and the second slider portion 112 (e.g., holes 118 and 119 shown in FIG. 4). The cable 130 is then inserted into a lock head 132 as shown in FIG. 10c. FIG. 11 shows the post assembly 121 while in the upright position from the rear view. As shown in FIG. 11, a cable is inserted through the holes of the post assembly 121 and locked using the lock head 132.

Figure 12:
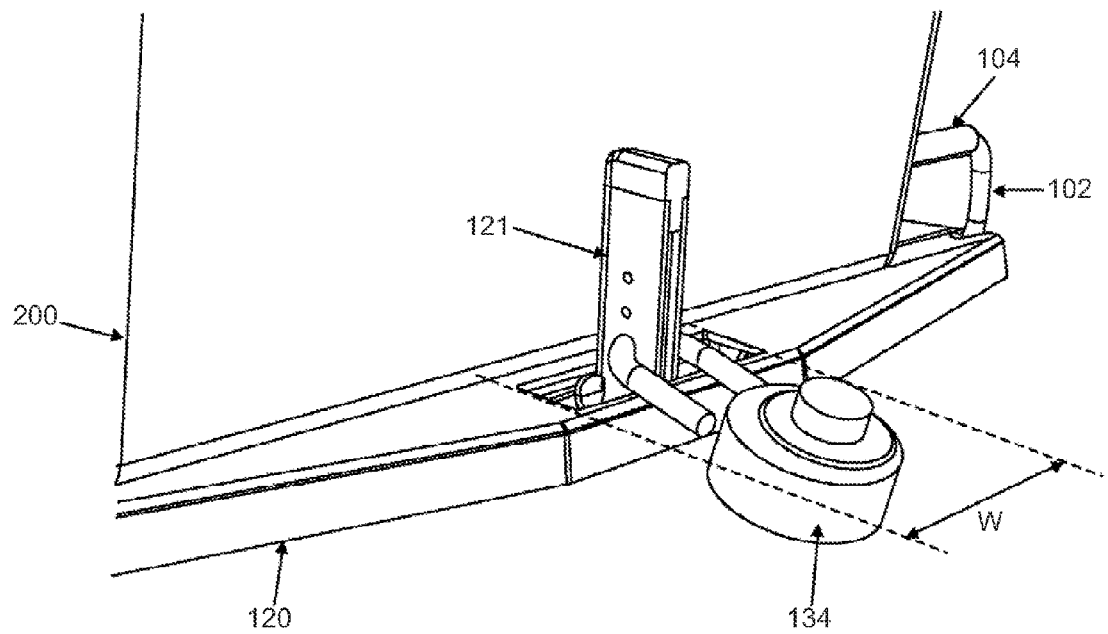
FIG. 12 shows a rear perspective view of a securing device showing lockout of post assembly using a padlock, according to an embodiment of the invention.
Figure 13:
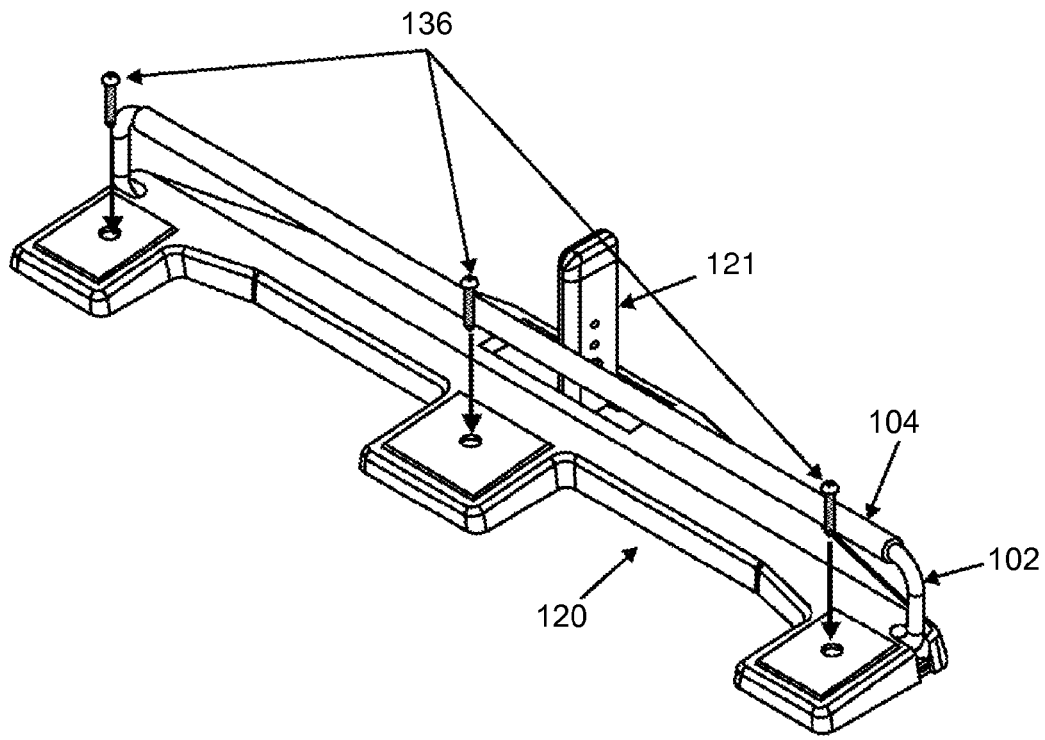
FIG. 13 shows a front perspective view of a securing device showing a mounting method using screws, according to an embodiment of the invention.

In another embodiment, a padlock may be used instead of a cable and a lock head. FIG. 12 illustrates an embodiment where a padlock 134 is used. In this embodiment, the plate assembly 120 may be secured to a surface so that a portable electronic device cannot be lifted and stolen while secured to the securing device 100. FIG. 13 illustrates the plate assembly 120 being secured to a surface with three screws 136. As shown in FIG. 13, the plate assembly 120 has three openings that allow the screws 136 to secure the securing device 100 to a surface of a desk, tabletop or other support surface.

Figure 14:
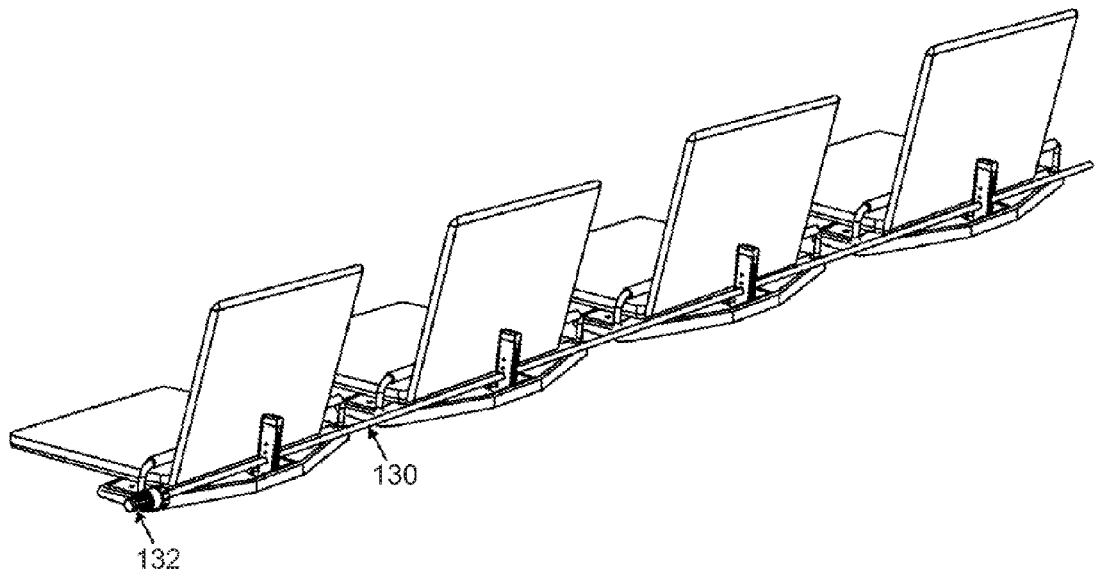
FIG. 14 shows a plurality of portable electronic devices secured using the securing device, according to an embodiment of the invention.
Figure 15:
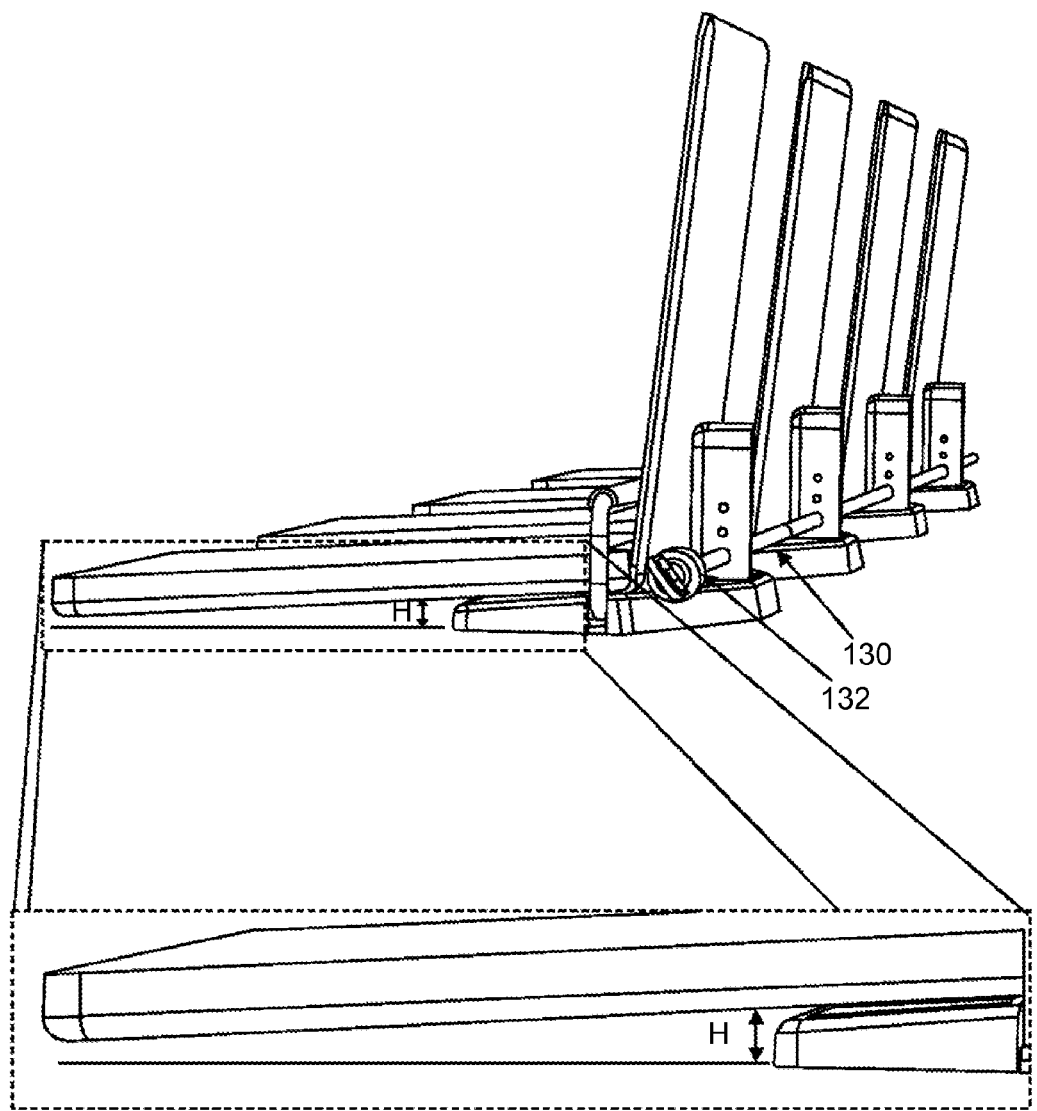
FIG. 15 shows a plurality of portable electronic devices with an area under a portable electronic device being highlighted, according to an embodiment of the invention.

FIG. 14 and FIG. 15 illustrate another embodiment of the invention where a plurality of portable electronic devices are secured to each other, and ultimately to an immovable object (not shown), with the cable 130 that runs through a plurality of post assemblies. The cable 130 is inserted in a lock head 132 at one end of the plurality of the plurality of portable electronic devices. This arrangement may advantageously be used in stores while several portable electronic devices are on display.

It can be appreciated that the novel deign of the securing device 100 provides several advantages. As shown in FIGS. 1, 10b, 11 and 12, from different angles, the post assembly 121 is advantageously able to slide laterally along the line W to avoid blocking ports of portable electronic devices. Such ports may include Universal Serial Bus (USB) ports, Ethernet ports, power cable, headphone and microphone jack, etc. This feature allows for the securing of all kinds of portable electronic devices while accommodating different designs. It also allows users to reach the ports that are located in the back of a portable electronic device.

The novel design of the plate assembly 120 can accommodate portable electronic devices of many different sizes. For example, the plate assembly 120 can accommodate 10-inch to 17-inch laptop computers and/or netbook computer. The protective sleeve 104 around the main bar 102 also protects the screen of portable electronic devices from scratches.

Further, the plate assembly 120 has a recessed profile allowing airflow through the bottom portion of the portable electronic devices while secured with the securing device 100. This advantageous feature can prevent the portable electronic devices from overheating. As shown in FIG. 15, when a portable electronic device is placed on the plate assembly 120, the rear portion of the portable electronic device (for example, a laptop computer as shown in FIG. 15) is raised to create the passage H below the bottom portion of the portable electronic device. The passage H along with the recessed profile of the plate assembly allows constant air flow to and from the bottom portion of the portable electronic devices that are secured with the securing device 100.

Figure 16:
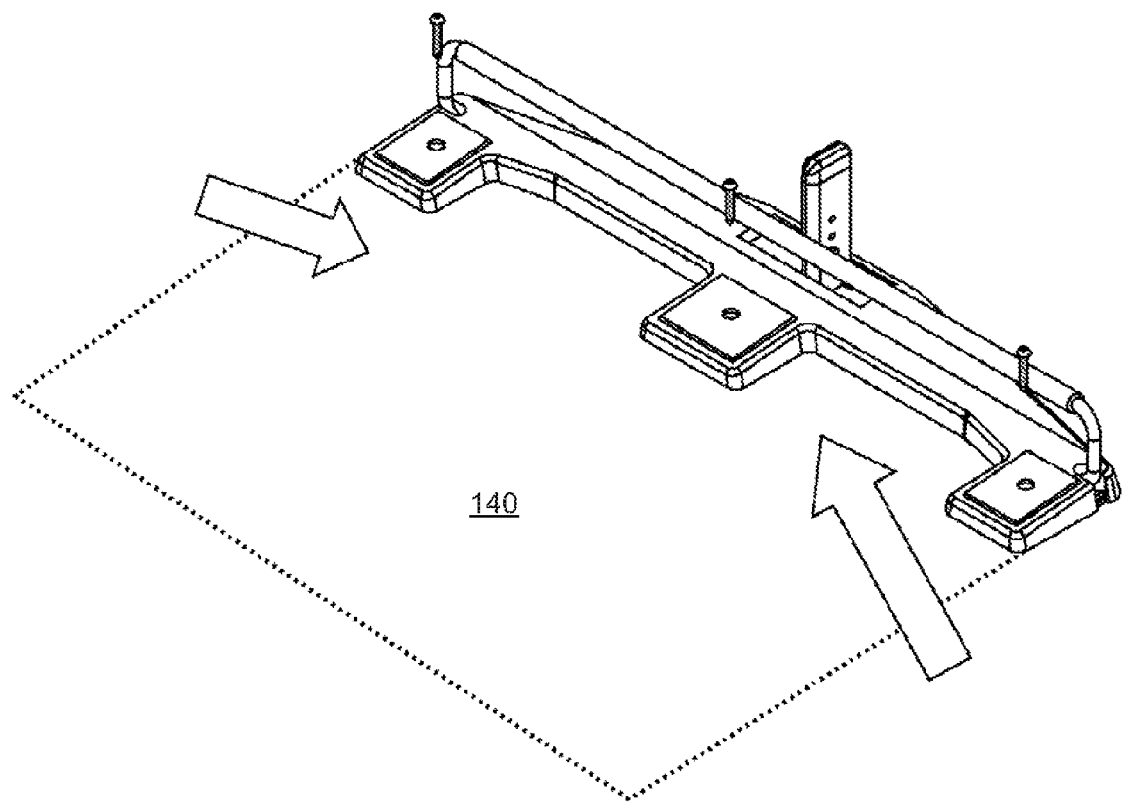
FIG. 16 shows a perspective view of the securing device, according to an embodiment of the invention.

This advantageous feature of the securing device 100 is also illustrated in FIG. 16. In some embodiments, the area 140 would be the approximate area covered by a portable electronic device (for example, a laptop computer or a netbook computer).

As shown in FIG. 16, the novel design of the securing device 100 allows for airflow (as indicated by the arrows) through the bottom portion of a portable electronic device that is secured by the securing device 100. This feature allows a portable electronic device to be both secured and operational with the securing device 100 for an extended period of time without causing the portable electronic device to overheat.

Any recitation of "a", "an" or "the" is intended to mean "one or more" unless specifically indicated to the contrary.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

What is claimed is:

1. A securing device for a portable electronic device, the securing device comprising:
   a plate assembly;
   a post assembly permanently coupled to the plate assembly, the post assembly capable of being in a first position and a second position, and
   a main bar coupled to the plate assembly,
   wherein the portable electronic device is capable of being secured between the main bar and the plate assembly and the post assembly, and wherein the post assembly is configured to be moved to the second position from the first position by rotating the post assembly to an upright position, and
   wherein the post assembly is adapted to slide along a portion of a length of the plate assembly thereby allowing access to the rear portion of the portable electronic device when inserted in between the plate assembly and the main bar.

2. The securing device of claim 1, wherein the post assembly is configured to allow the portable electronic device to be inserted between the plate assembly and the main bar when the post assembly is in the first position, and wherein the post assembly is configured to prevent a rearward movement of the portable electronic device when the post assembly is in the second position.

3. A securing device for a portable electronic device, the securing device comprising:
   a plate assembly;
   a post assembly permanently coupled to the plate assembly, the post assembly capable of being in a first position and a second position, and
   a main bar coupled to the plate assembly,
   wherein the portable electronic device is capable of being secured between the main bar and the plate assembly and the post assembly, and wherein the post assembly further comprises:
   a first slider portion;
   a second slider portion housing the first slider portion, wherein the first slider portion is secured to the second slider portion using a plurality of pins and wherein one end of the second slider portion has a plurality of protrusions;
   a trap plate coupled to a bottom portion of the first slider portion, wherein the trap plate has a bottom surface adapted to be captured, from its sides, by the plurality of protrusions of the second slider portion; and
   a top portion coupled with the second slider portion.

4. The securing device of claim 3, wherein the second slider portion is capable of moving along the length of the first slider portion.

5. The securing device of claim 3, wherein each of the first slider portion and the second slider portion have a plurality of holes, wherein a cable is capable of passing through the first slider portion and the second slider portion when the plurality of holes are aligned.

6. The securing device of claim 3, wherein each of the first slider portion and the second slider portion have a plurality of holes, wherein a lock is capable of passing through the first slider portion and the second slider portion when the plurality of holes are aligned.

7. The securing device of claim 1, wherein the portable electronic device is a computer.

8. The securing device of claim 1, wherein the plate assembly has a recessed profile allowing airflow through the bottom portion of the portable electronic device when the portable electronic device is secured with the securing device.

9. A method of securing a portable electronic device having a bottom portion and a screen portion coupled together, the securing device comprising a plate assembly, a post assembly permanently coupled to the plate assembly, the post assembly capable of being in a first position and a second position, and a main bar coupled to the plate assembly wherein the portable electronic device is capable of being secured between the main bar and the plate assembly and the post assembly, wherein the method of securing the portable electronic device comprises:
   inserting the bottom portion of the portable electronic device between the main bar and the plate assembly while in an open configuration the post assembly is in the first position; and
   moving the post assembly from the first position to the second position by rotating the post assembly to an upright position,
   wherein the post assembly is adapted to slide along a portion of a length of the plate assembly thereby allowing access to the rear portion of the portable electronic device when inserted in between the plate assembly and the main bar.

10. A method of securing a portable electronic device having a bottom portion and a screen portion coupled together, the securing device comprising a plate assembly, a post assembly permanently coupled to the plate assembly, the post assembly capable of being in a first position and a second position, and a main bar coupled to the plate assembly wherein the portable electronic device is capable of being secured between the main bar and the plate assembly and the post assembly, wherein the method of securing the portable electronic device comprises:
   inserting the bottom portion of the portable electronic device between the main bar and the plate assembly while in an open configuration; and
   moving the post assembly from the first position to the second position;
   wherein the post assembly has a plurality of holes, and wherein the method further comprises:
   inserting a cable through the plurality of holes, wherein the cable prevents the post assembly from moving back to the first position.

11. A method of securing a portable electronic device having a bottom portion and a screen portion coupled together, the securing device comprising a plate assembly, a post assembly permanently coupled to the plate assembly, the post assembly capable of being in a first position and a second position, and a main bar coupled to the plate assembly wherein the portable electronic device is capable of being secured between the main bar and the plate assembly and the post assembly, wherein the method of securing the portable electronic device comprises:
   inserting the bottom portion of the portable electronic device between the main bar and the plate assembly while in an open configuration; and
   moving the post assembly from the first position to the second position;
   wherein the post assembly has a plurality of holes, and wherein the method further comprises:
   inserting a pad lock through the plurality of holes; and
   locking the pad lock, wherein the pad look prevents the post assembly from moving back to the first position.

12. The method of claim 9, wherein the plate assembly has a recessed profile allowing airflow through the bottom portion of the portable electronic device when the portable electronic device is secured with the securing device.

13. The method of claim 9, wherein the portable electronic device is a computer.

14. The securing device of claim 1, wherein the portable electronic device is a laptop computer.

15. The securing device of claim 1, wherein the portable electronic device is a netbook computer.

16. The method of claim 9, wherein the portable electronic device is a laptop computer.

17. The method of claim 9, wherein the portable electronic device is a netbook computer.

* * * * *